May 26, 1970  G. E. GROSS  3,513,509

FLAG DRIVE PIN SCREW GROMMET

Filed Oct. 17, 1968

INVENTOR.
George E. Gross
BY
His Att'ys

United States Patent Office 3,513,509
Patented May 26, 1970

3,513,509
FLAG DRIVE PIN SCREW GROMMET
George E. Gross, Holly, Mich., assignor to Illinois Tool Works Inc., Chicago, Ill., a corporation of Delaware
Filed Oct. 17, 1968, Ser. No. 768,275
Int. Cl. A44b *21/00;* F16b *13/10*
U.S. Cl. 24—73                                  9 Claims

ABSTRACT OF THE DISCLOSURE

A grommet with a drive pin for locking the same in an apertured workpiece and with the drive pin having a lateral projection to follow a mating slot in the grommet body to abut the workpiece in the driven position thereof and prevent egress of the drive pin in that direction; the aperture remaining in the grommet rearwardly of the drive pin being such that it may receive a screw or the like for support purposes or for mounting another workpiece to the opposite end of the grommet with the screw contacting the adjacent end of the drive pin to prevent movement thereof in the opposite direction and thus positively lock the drive pin and restrain the same against loosening under vibration and the like.

---

The invention relates to new and useful improvements in a grommet with a drive pin to be driven along a complementary opening in the grommet body to expand or lock shouldered fingers or prongs passing through the workpiece aperture against the adjacent workpiece surfaces.

An object of the invention is to provide a grommet of the above type with the drive pin having means interfitting with the grommet to limit movement of the pin in the driven direction.

Another object of the invention is to provide a grommet of the above type wherein the pin has a lateral projection received in a complementary recess or slot in the grommet body to abut the workpiece when in driven position and thus prevent further movement thereof.

A further object of the invention is to provide a grommet of the above type wherein a mounting screw may be threaded into the grommet opening to secure or mount another workpiece thereto with the screw abutting the pin in its driven position to prevent movement thereof in the opposite direction.

A still further object of the invention is to provide a grommet assembly of the above type wherein the pin is positively maintained against accidental removal from vibration or the like or from being forced out of the end of the grommet by a screw having excessive length.

The above and other objects of the invention will in part be obvious and will hereinafter be more fully pointed out.

Figure 1:
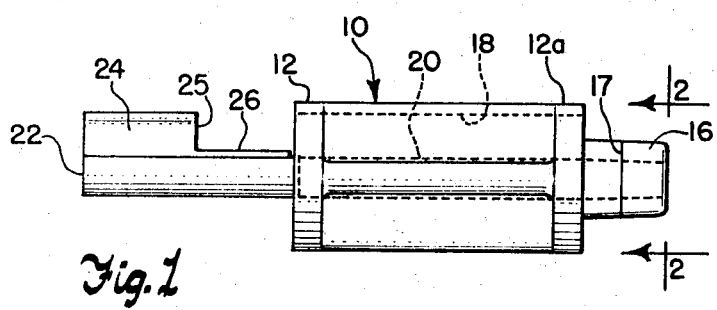
FIG. 1 is a side elevation showing the grommet with the drive pin in initial position before attachment to a workpiece.
Figure 2:
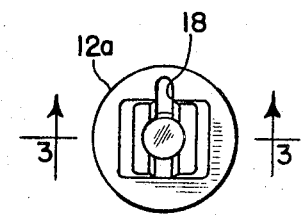
FIG. 2 is an end elevation of FIG. 1.
Figure 3:
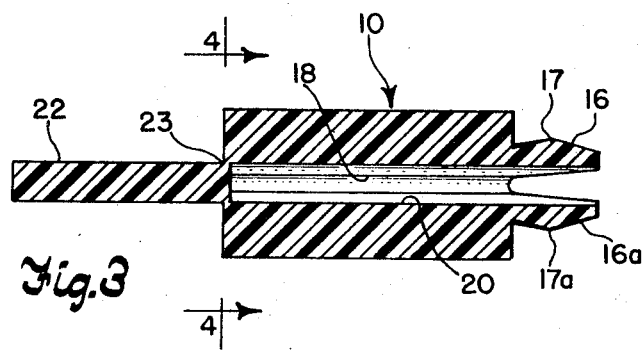
FIG. 3 is a sectional view taken along the line 3—3 of FIG. 2.
Figure 4:
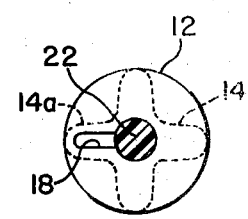
FIG. 4 is a sectional view taken along the lines 4—4 of FIG. 3.

Referring to the accompanying drawing, the grommet 10 may be of any suitable material, preferably a plastic material, in the form of a cylindrical body or, as illustrated, it may be provided with cylindrical end portions 12, 12a joined by longitudinally extending spaced rib portions 14, 14a. At one end of the grommet there are provided two prong or finger portions 16, 16a separated by a V-slot and including on the outer surface thereof shoulder portions 17, 17a. Within one of the ribs, as for example the rib 14a, there is provided a slot 18 extending throughout the length thereof and also opening through the end portions 12, 12a. This slot is inwardly open to communicate with a longitudinal aperture 20 extending through the grommet body portion and opening to the V-slot. At the opposite end of the grommet, there is provided a drive pin 22 having an initial shearable connection 23 with the adjacent end portion 12 of the grommet body. This drive pin 22 includes a radially outward projection 24 in the form of a "flag" and a narrow rib 26. Both the radial projection 24 and the rib 26 are illustrated as aligned with the slot 18 extending through the grommet body. However, the rib and projection could be circumferentially spaced with the rib following another similarly spaced slot along the grommet aperture. In either case, the rib serves to maintain alignment of the projection 24 with the slot 18.

Figure 5:
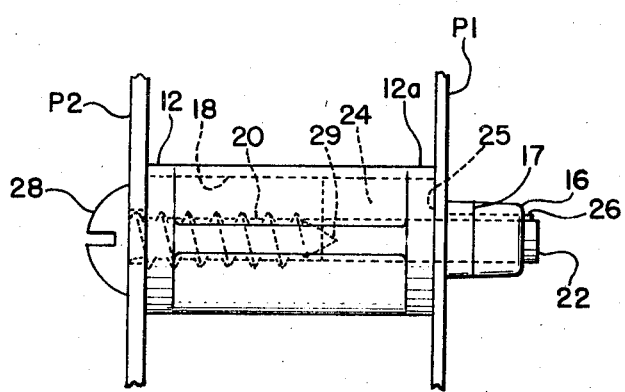
FIG. 5 is a side elevation similar to FIG. 1 but showing in dotted lines the inwardly driven position of the drive pin and the application of a screw for attaching an additional panel.

When it is desired to initially mount the grommet to an apertured workpiece or panel P1, the prongs 16, 16a are forced through the aperture in the workpiece with compression thereof toward one another until the shoulder portions 17, 17a spring back at least to some extent to engage in rear of the panel and mount the grommet thereto. When in this position, the drive pin 22 may be forcibly driven inwardly to rupture the shearable connection 23 with the rib with the flag portion 24 following the slot 18 until the drive pin is in the position shown in FIG. 5. In this position, the inner edge 25 of the flag portion will bottom against the adjacent surface of the workpiece P1, thus limiting further movement of the drive pin in that direction. It is to be noted that the rib 26 follows the slot 18 to prevent rotation of the pin 22 after rupture of the connection 23, thus assuring proper orientation of the projection 24 to enter the slot 18 as the pin moves on the driven direction.

The grommet mounted as described immediately above may be employed as a support for some other element, as a shelf or the like, but it may also be used to space the panel or workpiece P1 from another apertured panel or workpiece P2. Referring again to FIG. 5, the panel P2 may be positioned with its aperture registering with the opening 20 through the grommet and a screw 28 may be passed therethrough to threadedly engage the inner surface of the grommet opening 20 and secure the panel P2 thereto. The length of the screw is selected so that, within limits, the inner end 29 thereof will abut or bite into the adjacent inner end of the drive pin 22 in its driven position, thus to prevent movement of the drive pin in the opposite direction, that is, away from the panel P1. Still further, the screw 28 might be of a type having an axial or other projection in place of its head to also serve as a support for some other element, as for example, a shelf or the like.

With such an assembly, the drive pin is limited in its movement to the driven position and cannot be forced therebeyond by reason of the engagement of the edge 25 of the flag portion with the adjacent surface of the panel P1. Further, the drive pin cannot be moved in the opposite direction by reason of its abutment with the inner end of the screw. Thus, the drive pin is positively located so that it cannot be loosened by vibration or removed by forceful driving or the like.

While one form of the invention has been shown for purposes of illustration, it is to be clearly understood that various changes in details of construction and arrangement of parts may be made without departing from the scope of the invention as set forth in the appended claims.

I claim:
1. A grommet adapted for connection to an apertured workpiece, and comprising a body portion with a longitudinal opening therethrough and a pair of outwardly shouldered spaced prongs at one end thereof for connecting the grommet to the workpiece with the prongs passed through the workpiece aperture and the shoulders thereof engaging the adjacent face of the workpiece and with the end of the grommet body portion abutting the opposite face of the workpiece, said grommet body portion having a longitudinal slot therethrough in communication with said opening, and a drive pin at the opposite end of said grommet body portion aligned with the longitudinal opening therethrough and having lateral projecting means initially in alignment with the longitudinal slot through the grommet body portion whereby driving the pin along the grommet opening will effect movement of the projecting means along the slot to abut the adjacent face of the workpiece and limit further movement thereof in the driven direction with the inner end of the pin positioned between said prongs to prevent inward movement thereof away from shouldered engagement with the adjacent face of the workpiece.

2. A grommet as claimed in claim 1, wherein the lateral projecting means is of lesser length than the pin and initially in outwardly spaced alignment with the longitudinal slot through the grommet body portion.

3. A grommet as claimed in claim 2, wherein the pin includes a rib along the surface thereof inwardly of said projecting means and cooperating with complementary means along the grommet body portion to guide the projecting means to said slot.

4. A grommet as claimed in claim 1, wherein the lateral projecting means comprises a flag-type projection with the inner edge thereof initially spaced from the grommet body portion and then abutting the workpiece when the pin is in its driven position.

5. A grommet as claimed in claim 4, wherein the pin is provided with a radial rib initially adjacent the grommet body portion in alignment with said slot to guide the projection into the slot when the pin is driven inwardly of the grommet body portion.

6. A grommet as claimed in claim 1, wherein the pin is initially joined to the grommet body portion by a shearable connection adjacent the opening therethrough.

7. A grommet as claimed in claim 6, wherein the lateral projecting means comprises a flag-type projection with the inner edge thereof spaced outwardly of the shearable connection, and wherein the pin is provided with a rib disposed closely adjacent the shearable connection and also in alignment with said slot to enter the same and guide the projection into the slot when the shearable connection is broken upon driving the pin.

8. A grommet as claimed in claim 1, in combination with a screw threaded into the opening in the body portion to abut the end of the pin in its driven position and prevent movement thereof in the opposite direction.

9. A grommet as claimed in the combination of claim 8, wherein the screw operates to support another element in spaced relation to the workpiece.

References Cited

UNITED STATES PATENTS

| | | | |
|---|---|---|---|
| 2,438,533 | 3/1948 | Booth | 85—84 |
| 2,657,894 | 11/1953 | Sklenar | 248—239 |
| 3,342,000 | 9/1967 | Cripe | 24—73 XR |
| 3,393,599 | 7/1968 | Fisher | 85—72 |

DONALD A. GRIFFIN, Primary Examiner

U.S. Cl. X.R.

85—72; 248—239